United States Patent [19]

Steeber

[11] Patent Number: 5,253,744
[45] Date of Patent: Oct. 19, 1993

[54] ACCUMULATOR

[75] Inventor: Dorian F. Steeber, Taylors, S.C.

[73] Assignee: Hartness International, Greenville, S.C.

[21] Appl. No.: 960,254

[22] Filed: Oct. 13, 1992

Related U.S. Application Data

[63] Continuation of Ser. No. 669,744, Mar. 15, 1991, abandoned.

[51] Int. Cl.⁵ .............................................. B65G 1/00
[52] U.S. Cl. ................................................ 198/347.3
[58] Field of Search ................................... 198/347.3

[56] References Cited

U.S. PATENT DOCUMENTS

| | | | |
|---|---|---|---|
| 2,014,458 | 9/1935 | Winkley | 198/426 |
| 3,016,780 | 1/1962 | Mosen | 83/417 |
| 3,178,008 | 4/1965 | Solet | 198/546 |
| 3,340,992 | 9/1967 | Seragnoli | 198/347.3 |
| 3,470,996 | 10/1969 | Lee et al. | 198/347.3 |
| 3,499,555 | 3/1970 | Wahle | 214/16.4 |
| 3,762,582 | 10/1973 | Barnhart et al. | 198/347.3 X |
| 3,788,054 | 1/1974 | Haussmann et al. | 198/347.3 X |
| 4,018,325 | 4/1977 | Rejsa | 198/347.3 |
| 4,161,094 | 7/1979 | Blidung et al. | 53/493 |
| 4,220,236 | 9/1980 | Blidung et al. | 198/347.3 |
| 4,273,234 | 6/1981 | Bourgeois | 198/347.3 |
| 4,274,530 | 6/1981 | Carter et al. | 198/347.3 |
| 4,499,987 | 3/1985 | Long | 198/347.3 |
| 4,560,057 | 12/1985 | Applegate et al. | 198/347.3 |
| 4,711,336 | 12/1987 | Mattei | 198/347.3 |
| 4,830,170 | 5/1989 | Focke | 198/347.3 |
| 4,989,718 | 2/1991 | Steeber | 198/347.3 |
| 5,038,909 | 8/1991 | Covert | 198/347.3 |

FOREIGN PATENT DOCUMENTS

| | | |
|---|---|---|
| 0187981 | 7/1986 | European Pat. Off. . |
| 1761019 | 5/1979 | Fed. Rep. of Germany ...... 198/347 |
| 2800570 | 7/1979 | Fed. Rep. of Germany . |
| 2803320 | 8/1979 | Fed. Rep. of Germany ...... 198/347 |
| 2170169 | 7/1986 | United Kingdom . |

Primary Examiner—Robert P. Olszewski
Assistant Examiner—James R. Bidwell
Attorney, Agent, or Firm—Dority & Manning

[57] ABSTRACT

Surge control or accumulator apparatus and corresponding method include a relative downstream shift operation of a particular distance in combination with stopping the inflow of products at a particular upstream point such that product shear points are positively eliminated for accumulator product removal operations. An infeed stop mechanism traps the leading edge of an appropriate package while permitting other packages to be advanced beyond known shear points during the downstream shift operation. The infeed stop mechanism uses a slidable stop plate and upstream therefrom a wedge shaped guide member to cooperatively trap the leading edge of an approaching product in a pinchless operation, i.e., without applying clamping force to such product or to other products permitted to pass by the slidable stop plate. An outfeed mechanism includes an adjustable downstream shift feature for controllably shifting a row of products to be removed from a conveyor. The adjustable amount of downstream shift is related to the nominal length of individual products advancing along the conveyor and an additional predetermined distance added thereto. By shifting products downstream, for example, by about 150 percent of the nominal product length while setting the pinchless infeed trap, an appropriate row of products for removal are isolated from potential shear points, without depending on the precise number of products contained in such row. The surge control or accumulator method and apparatus results in safe handling of products regardless of the cumulative effect of unpredictable variations in the sizes of individual products being handled.

43 Claims, 5 Drawing Sheets

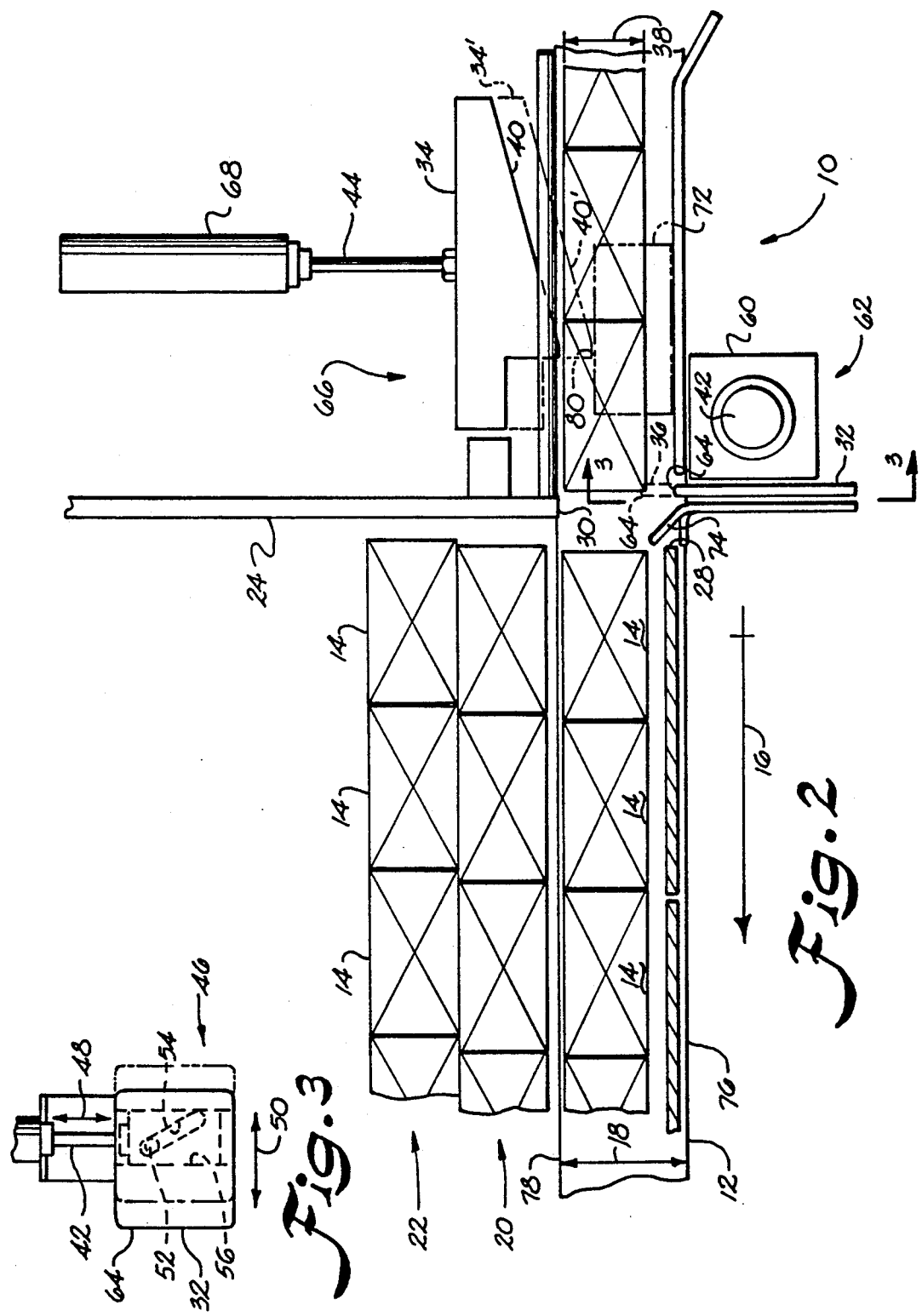

ACCUMULATOR

This is a continuation of U.S. application Ser. No. 07/669,744, filed Mar. 15, 1991, which was abandoned upon the filing hereof.

BACKGROUND OF THE INVENTION

The present invention in general concerns improved surge control (i.e., accumulator) apparatus and method, and more particularly concerns improved method and apparatus for providing accumulator operations which positively prevent the occurrence of product shear points, regardless of variations in the exact sizes of products from their nominal size, or the initial position of the products relative the conveyor prior to a product removal operation.

The entire disclosure (including all description and every figure thereof) of Steeber, U.S. Pat. No. 4,989,718, issued Feb. 5, 1991, is fully incorporated herein by reference as if the same subject matter (both by way of background and as to essential subject matter) were presented and recited herein.

A long-term problem in production line operations is to ensure smooth and continuous operation of the production line and components thereof. However, it is well known and widely experienced that various components or workstations along the conveyor or production line may operate at different rates of speed, thereby resulting in a blockage or queue of products developing at one or more points along the production line. In general, the foregoing problem has been addressed by the addition of accumulator devices for temporarily removing and storing products backing up along a production line or conveyor. However, the presence of such devices also in some respects creates an additional component which is subject to breaking down or causing other problems relative the production line. If such occurs, the accumulator device very undesirably becomes a liability to the production line or conveyor rather than the asset and advantage which was intended.

The improved accumulator of the above-referenced '718 patent advantageously addresses many of the general problems of accumulator operations so as to minimize mishandling of products which can result in highly undesirable failed operations of the accumulator. However, one more specific problem faced during accumulator operations is the accommodation of unpredictable variations in the sizes (from their nominal size) of individual products being handled, particularly where such variations cumulatively result in highly significant dimensions relative a line (or slug) of products to be removed from a conveyor. The advantageous methodology and apparatus of the above-referenced '718 patent inherently may accommodate cumulative variations of, for example, up to approximately ¾ of an inch to perhaps an inch. Such degree of accommodation is entirely adequate in many circumstances. The greater difficulty comes in those situations where the cumulative variations exceed even such amount. When such an excessive situation develops, the result can be the existence of interference (i.e., product shear points) between fixed members of the accumulator and products remaining on the conveyor or being removed therefrom.

One example of an accumulator device which refers to the occurrence of product size variation is Mattei (United Kingdom published Patent Application No. 2170169; published Jul. 30, 1986). It is noted in lines 71 through 77 of page 1 of such publication that slight and unpredictable variations in the size of products can result in variation in the longitudinal dimension of the group of products to be removed such that the group projects beyond the end of an intended storage area resulting in interference with fixed components of the accumulator during storage operations. The Mattei apparatus intends to eliminate such problem by providing an extracting means for literally removing a potential trouble packet from the group of packets to be removed and stored.

The Mattei approach does not necessarily render a positive solution to the situation of excessive growth (or shrinkage). Another difficulty with such approach is the inherent limitation on any device which relies on (or expects) a product with which it interacts being located in a particularly place (within given tolerances). In other words, an extraction device or clamping arrangement of any type which mechanically operates at a predetermined point relative a conveyor can potentially fail to adequately grasp or retain (i.e., engage) an intended packet because of the initial position of such packet relative the mechanism. The result of a near miss can be the creation of an additional shear point or even damage or crushing of one or more packets. Worst case situations can include jamming of the device resulting in failure of the accumulator.

Another facet of the problem generally related to unintended and unpredictable variations in the size of specific packets is the considerable number of different factors which can cause such variations. In order words, such a large number of factors can cause variations that it is virtually impossible to adequately control or eliminate all such factors, wherefore the above-mentioned cumulative variation problem can not as a practical matter be prevented from occurring in an accumulator apparatus.

Using for example products of the type comprising an aseptic paper package filled with liquid (as generally discussed in the above-referenced '718 patent), the following factors are exemplary. In the accumulator operations described in the '718 patent, a slug of products can include a number such as 24, 27, or 30 packages. Variations of, for example, 1/32 of an inch per package can result in significant cumulative differences over the length of the slug. With the accumulator mechanism of the '718 patent, products preferably are systematically held at the outfeed end of the accumulator; hence, the specific location of a product at the outfeed end is established with reasonable certainty. Accordingly, the greater problems of not knowing with certainty the location of a product occurs at the infeed side (i.e., upstream side) of the accumulator mechanism.

One potential variation in the above-mentioned exemplary type of product can occur in the paper being used to make the packages. If a given lot of paper is slightly thicker than a previous lot, the resulting sizes of the cartons will relatively increase, quickly giving rise to the cumulative dimensional problem discussed above. Likewise in the area of package formation, wear in the machine making the package can result in slightly different dimensions of a finished package. For example, if the edge of a fold or creasing member wears over time, then the associated dimension of a package being formed will slightly change. In general, accumulator devices of present constructions and types of operation must be adjusted over time to compensate for wear in the folding mechanisms or the like of such carton forming machines.

Another factor in the area of the paper itself is that shipments of paper from different sources can involve paper of the same thickness, but of slightly softer or slightly more rigid construction. The resulting difference in the finished package is seen as differences in the amount of package compression as they move along the production line, again creating the potential for adverse cumulative dimensional effects.

Another potential factor in the case of liquid filled containers is slight variation in the amount of volume being introduced into the container, which variations can cause the size of the packages to grow or shrink.

Even if the packages themselves are the same, other mechanical factors can affect the cumulative dimensions of a slug of packages. For example, as lubrication on the conveyor belt changes over the course of time, the coefficient of friction for a chain drive or the like for the conveyor may vary, which results in more or less axial (i.e., in the drive direction of the conveyor) compressive forces on the packages, again affecting the position of the packages at the infeed of an accumulator device. Such problem particularly may occur where the accumulator operations take place (as they often do) while the production line or conveyor continues to run. In such instance, the queue or slug of products simply are sliding relative the conveyor, which moves continuously. Accordingly, the potential compression of products is constantly a factor to consider.

Another example of a factor which is not strictly based on variations in the sizes of individual products is that one or more packages may occasionally become tipped while traveling on the conveyor belt. For many packages, the height of the package is greater than (or at least different from) the length of the package when in an upright position. Accordingly, if a package becomes tipped, there can be a considerable change in the cumulative dimension of a group of packages. For example, the occurrence of a single tipped package could be enough to cause a mechanism such as the extraction device of Mattei (UK Patent Application No. 2170169) to entirely miss its intended package (or to grab two adjacent packages). Again, the general problem with such an approach to the overall technical problem is that a deficiency arises if the target or intended package is not precisely in its expected position.

In view of the numerous different factors which can cause or influence the problems associated with cumulative variations in a line or slug of products to be removed from a conveyor with an accumulator apparatus, it is not a practical solution to attempt to address and control all such factors individually so as to prevent the occurrence of the problem in the accumulator apparatus. Nor is it an entirely satisfactory approach in every instance to address the overall problem with mechanisms which depend on the products being at an expected position (within certain limited deviations therefrom). Nor, in general, is it desirable to increase the complexity of existing accumulator devices since added complexity often results in additional breakdown problems, thereby further defeating the overall purpose of the accumulator device.

SUMMARY OF THE INVENTION

The present invention recognizes and addresses various of the foregoing problems, and others, concerning accumulator operations. Thus, broadly speaking, a principal object of this invention is improved accumulator operations, including both improved apparatus and improved methodology. More particularly, a main object is improved method and apparatus for surge control or accumulator operations pertaining to the elimination of damage to products, such as occur, for example, from the existence of product shear points.

It is another present general object to provide apparatus and methodology which automatically and fully compensates for unpredictable variations in product sizes, which could otherwise adversely give rise to cumulative dimensional problems for a line or slug of products to be removed from a conveyor. It is a more specific object of the present invention to provide an apparatus which positively displaces a line of products to be removed by an amount adequate to eliminate product shear points, when operative in combination with stopping the infeed of products to the accumulator. It is another more specific object to provide for the infeed stopping or trapping of a correct product relative other accumulator operations to ensure that all products advancing therefrom towards the accumulator are safely received therein, advanced downstream beyond potential product shear points.

It is another present object to provide improved method and apparatus which results in products being removed undamaged from a conveyor belt by an accumulator device, regardless of the initial position of products relative the accumulator apparatus whenever removing steps are commenced. It is a further present object to ensure that such products to be removed are isolated from line pressure along the conveyor while also being positively directed past potential product shear points regardless of their initial position, so as to prevent shear point damage thereto during their removal.

It is a still further present object to generally eliminate the deficiencies and shortcomings of prior art clamping mechanisms which rely on the presence of products at specific conveyor points, within generally limited tolerances or deviations therefrom. More specifically, it is an aspect of the invention to be able to trap or otherwise stop an appropriate product while permitting other products to continue downstream on the conveyor, rather than to blindly clamp any and all objects at a particular point on the conveyor, thus eliminating prior art difficulties wherein products are clamped in undesired manners or locations.

It is another present object to provide an improved adjustable outfeed shift apparatus, either for use with an accumulator device, or incorporated into the accumulator device, which is user adjustable for satisfying objects of the present invention to ensure an adequate downstream shifting of products to eliminate product shear points.

It is a separate, further present object to provide a pinchless infeed stop mechanism which advantageously interrupts travel of an appropriate product while not interrupting the travel of other products and which is operative without requiring the application of clamping force to the products.

It is another present object to achieve the foregoing improved method and apparatus for accumulators without undesirably and disadvantageously increasing the complexity of the resulting apparatus. At the same time it is a present object to eliminate unnecessary pinch or clamping points for packages while still fully and automatically compensating for variations in package size regardless of what factor or factors cause or contribute to such variations.

It is still another general present object to safely and efficiently accumulate such a line or slug of products as can be accommodated in the accumulator mechanism without product shear point damage, without regard to the number of products actually contained in a given line or slug of such products.

Another present object is to provide the foregoing improved method and apparatus for accumulator operations which may be used with or incorporated into various existing accumulator devices, or which advantageously may be used further in combination with the improved accumulator apparatus and method as disclosed in the above-referenced Steeber (U.S. Pat. No. 4,989,718).

Additional objects and advantages of the invention are set forth, or will be apparent to those of ordinary skill in the art, from the detailed description which follows. Also, it should be appreciated that modifications and variations to the specifically illustrated and discussed features hereof may be practiced in various embodiments and uses of this invention without departing from the spirit and scope thereof, by virtue of present reference thereto. Such variations may include, but are not limited to, substitution of equivalent means and features, materials, or steps, for those shown or discussed, and the functional or positional reversal of various parts, features, or steps, or the like.

Still further, it is to be understood that different embodiments, as well as different presently preferred embodiments, of this invention may include various combinations or configurations of presently disclosed steps, features, or their equivalents (including combinations of features or steps or configurations thereof not expressly shown or stated). One exemplary such embodiment of the present invention relates to a method of surge control for products being transported via a moving conveyor belt means in a predetermined downstream direction between two production areas. Such method includes providing an accumulator device with an upstream infeed and a downstream outfeed, and situated alongside the conveyor belt means intermediate the two production areas, which accumulator device is capable of controllably removing products from the conveyor belt means in the event of a backup of products being fed to the downstream production area. The subject method preferably further includes controllably removing products from the conveyor belt means with the accumulator device if a queue of products develops within the accumulator device between the outfeed and infeed thereof.

The foregoing removing step includes preferably establishing an infeed trapping point and engaging the leading edge of any product transported thereagainst by the conveyor belt means, such trapping point being situated along the conveyor belt means a predetermined distance upstream from the accumulator device infeed. The removing step further includes relatively shifting the queue of products an adequate distance downstream such that all products downstream of the infeed trapping point and not engaged thereat are transported downstream at least to the accumulator device infeed. In such fashion, products may be removed undamaged from the conveyor belt means by the accumulator device regardless of the relative position of products at the device infeed whenever the removing step commences.

Another present exemplary method of controlling the flow of products advancing along a conveyor involves the initiation of a particular product removal sequence in the context of operation of an accumulator device such as of the invention set forth in Steeber (U.S. Pat. No. 4,989,718). In such an embodiment, the product removal sequence preferably includes setting a trap at an established upstream trapping point for the leading edge of the next product approaching the trapping point from the direction of an upstream workstation. It further includes relatively shifting the products within the apparatus queue an adequate distance downstream such that products in any portion downstream from the trapping point are shifted beyond the accumulator means infeed side shear point while products upstream from the trapping point become trapped thereat. Thereafter, the accumulator means may be operated for removing products from the conveyor within the apparatus. Meanwhile, products are isolated from line pressure along the conveyor and positively directed past potential product shear points regardless of their initial position.

Still further, the present method may advantageously include user-selected adjustment of the downstream shift distance, which itself may be related to the nominal length of individual products being advanced along the associated conveyor. Preferably such distance is equal to about the nominal product length added to the distance which the trapping point resides upstream from the accumulator means infeed side (or at least the accumulator means infeed side shear point).

Yet another present embodiment comprising an exemplary construction in accordance with the present invention is related to an infeed product engagement apparatus for use along a conveyor forming a pathway moving in a defined downstream direction between two workstations. Such conveyor preferably is feeding products through an accumulator means of the type which controllably removes a queue of products from the conveyor whenever there is a backup of products within the accumulator means.

The foregoing infeed product engagement apparatus comprises an interruption means for selectively interrupting product travel in at least a first part of the moving pathway of the conveyor situated relatively upstream from the accumulator means; and guide means, situated relatively upstream from the interruption means, for selectively guiding products carried on the conveyor into the pathway first part, so that downstream movement of such guided products is subsequently interrupted by the interruption means.

Yet another present exemplary embodiment of the invention is related to an outfeed product engagement apparatus for use with the above-referenced types of accumulator means and associated conveyor. Such outfeed product engagement apparatus comprises a controllable product engagement member, engagement actuation means, and shift actuation means.

The foregoing exemplary engagement actuation means is preferably for selectively positioning the product engagement member between a first position thereof relatively just downstream from the accumulator means and relatively adjacent the conveyor so as to stop the movement of products along the pathway thereof, and a second position thereof adequately displaced from the conveyor so as to not contact products thereon.

The foregoing shift actuation means is preferably for selectively shifting the product engagement member with products received thereagainst between the first position thereof, and a third position thereof relatively adjacent the conveyor so as to stop the movement of products therealong and downstream from the first position by a total shift distance comprised of a predetermined minimum shift distance added to the length of a product being moved on the conveyor, while feeding of products into the upstream end of the accumulator means is controlled. With such an arrangement, products to be removed from the conveyor with the accumulator means may be controllably shifted relative thereto prior to such removal so as to prevent product shear points between the accumulator means and such products and between the accumulator means and products remaining on the conveyor.

Still further embodiments of the subject invention relate to an improved accumulator device generally of the type having a vertically-oriented conveyor with a plurality of spaced outwardly extending veins for accumulating products therebetween, with indexing of such conveyor resulting in alternate removal or return of products relative a carrying surface of a production line. Such improved accumulator device in accordance with this invention includes output shift means and input product trapping means. The output shift means are preferably relatively adjacent the output of the accumulator device and operative for selectively shifting products a selected downstream distance. The input product trapping means are relatively adjacent the input of the accumulator device a selected upstream distance therefrom and operative for selectively capturing without use of clamping force the leading edge of the next product having its leading edge upstream therefrom. Such selected downstream distance comprises the nominal length of one of the production line products added to the selected upstream distance, so that cooperative actuation of the output shift means and the input product trapping means prevent the occurrence of product shear points adjacent input and output edges of the conveyor veins.

Further present exemplary method and apparatus also include product handling apparatus and method generally of the type described in Steeber (U.S. Pat. No. 4,989,718), and variously incorporating or in combination with present method and apparatus features.

Those of ordinary skill in the art will better appreciate the features and aspects of such embodiments (both method and apparatus), and others, upon review of the remainder of the specification.

BRIEF DESCRIPTION OF THE DRAWINGS

A full and enabling disclosure of the present invention (both method and apparatus), including the best mode thereof, directed to one of ordinary skill in the art, is set forth in the remainder of the specification, which makes reference to the appended figures, in which:

FIG. 2 is a top plan view of the exemplary apparatus of present FIG. 1, illustrated in relation to an exemplary conveyor and associated products carried thereon with which such apparatus may be practiced;

FIG. 3 is a side elevational view of exemplary interruption means in accordance with the present invention, taken along the view line 3—3 as illustrated in present FIG. 2;

Figure 1:
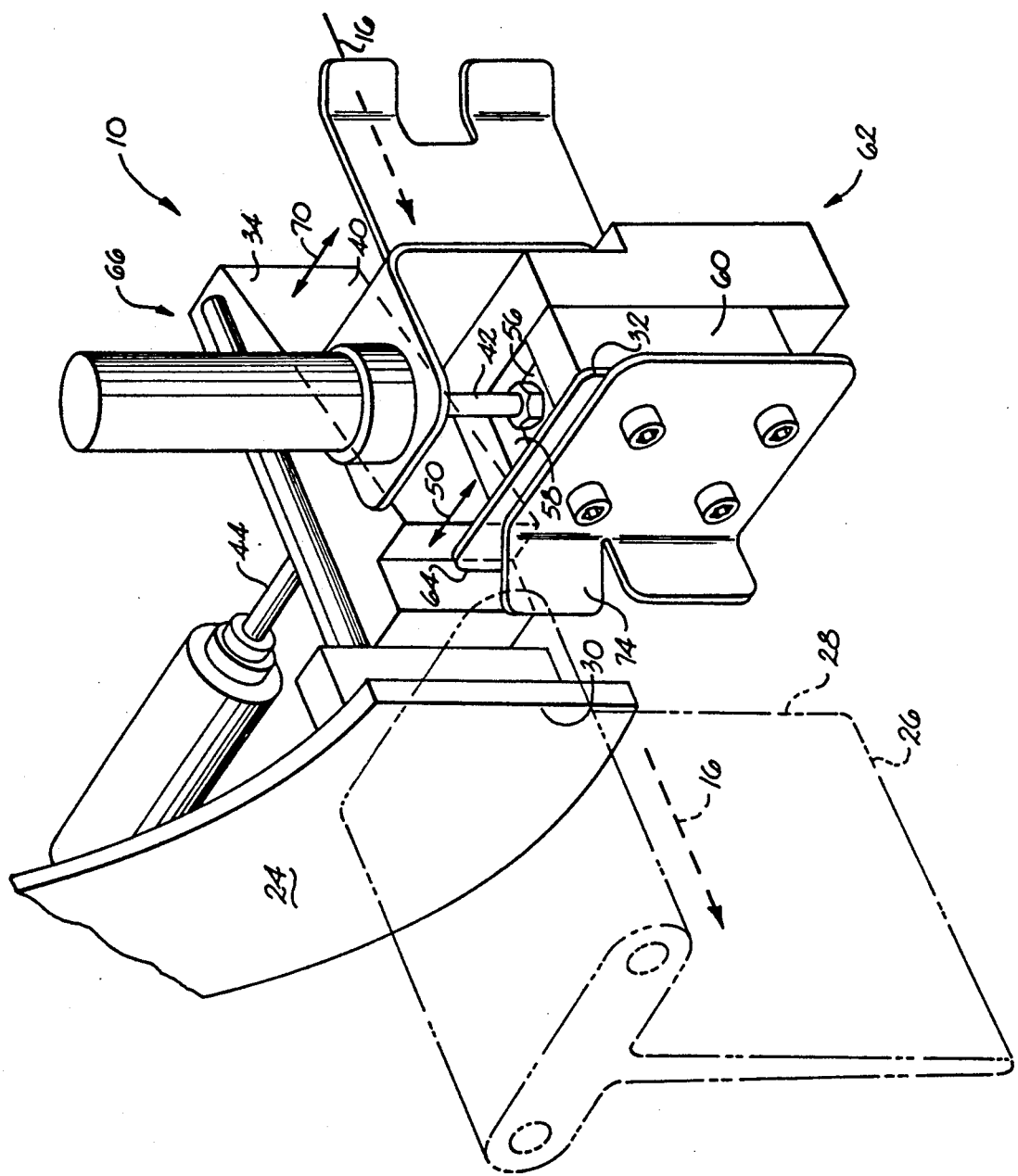
FIG. 1 is an isolated, perspective view of an exemplary embodiment of an infeed product engagement apparatus in accordance with the subject invention.

Repeat use of reference characters throughout the present specification and appended drawings is intended to represent same or analogous features, elements, or steps of the invention.

DETAILED DESCRIPTION OF THE PREFERRED EMBODIMENTS

Those of ordinary skill in the art will appreciate that the following specific constructions are simply by way of example only, and are not intended as limiting the broader aspects of the present method and apparatus. Also, reference herein to the '718 patent is intended to mean Steeber (U.S. Pat. No. 4,989,718), which is fully incorporated herein by reference. Some of the present subject matter generally referred to hereinbelow is represented in the figures of the '718 patent and discussed fully therein. For example, control means which may be practiced in accordance with this invention may assume various constructions, such as for example the control means discussed in conjunction with housing 38 of FIG. 1 of the '718 patent. Just as in such '718 patent, this invention may be practiced with numerous different types and shapes of packages, though certain preferred embodiments are specifically adapted for use with aseptic paper package such as produced by TetraPak in a 250 milliliter size, or similar.

Figure 4:
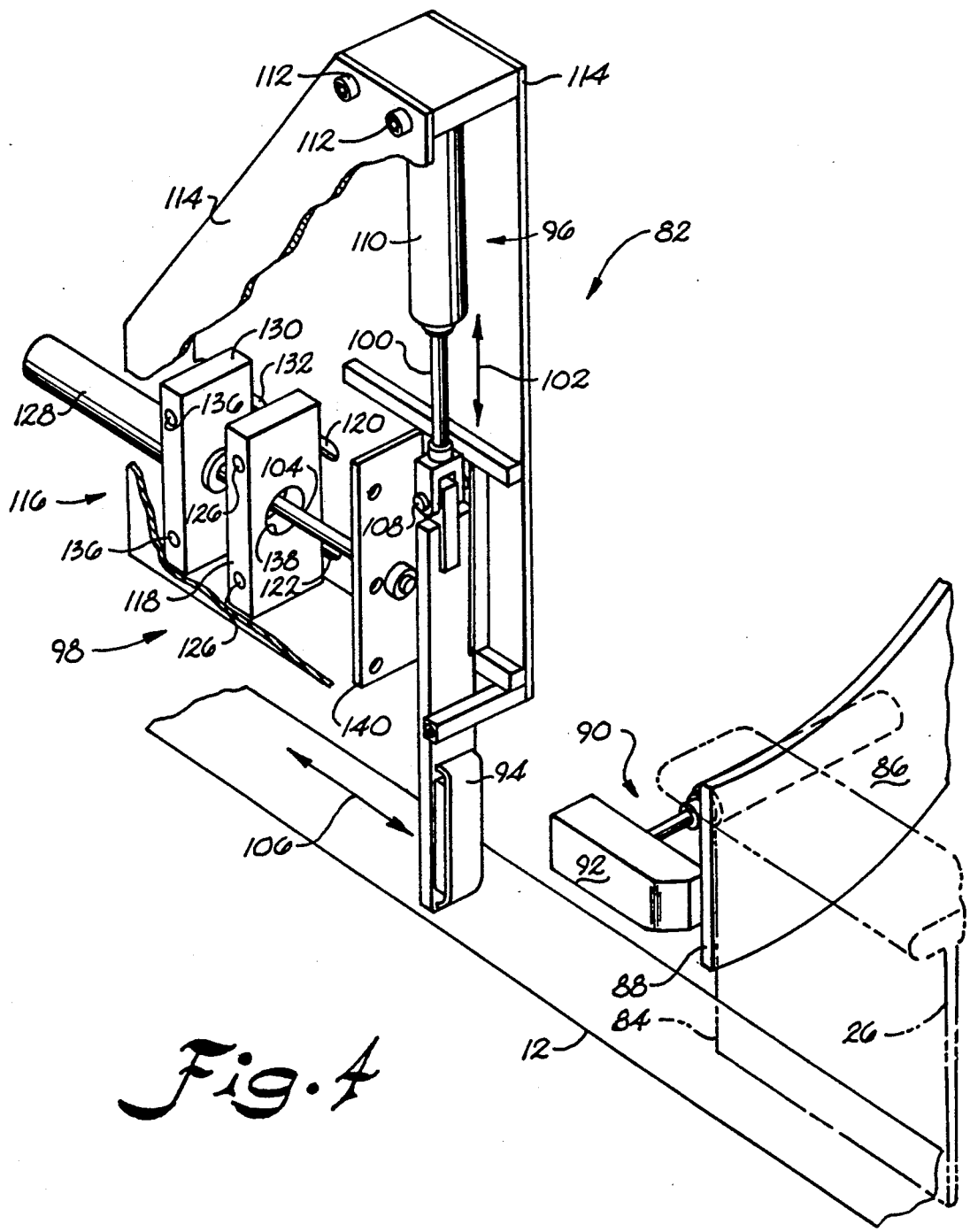
FIG. 4 is an isolated, perspective view (in partial cutaway) of an exemplary embodiment of an outfeed product engagement apparatus in accordance with the subject invention.
Figure 5:
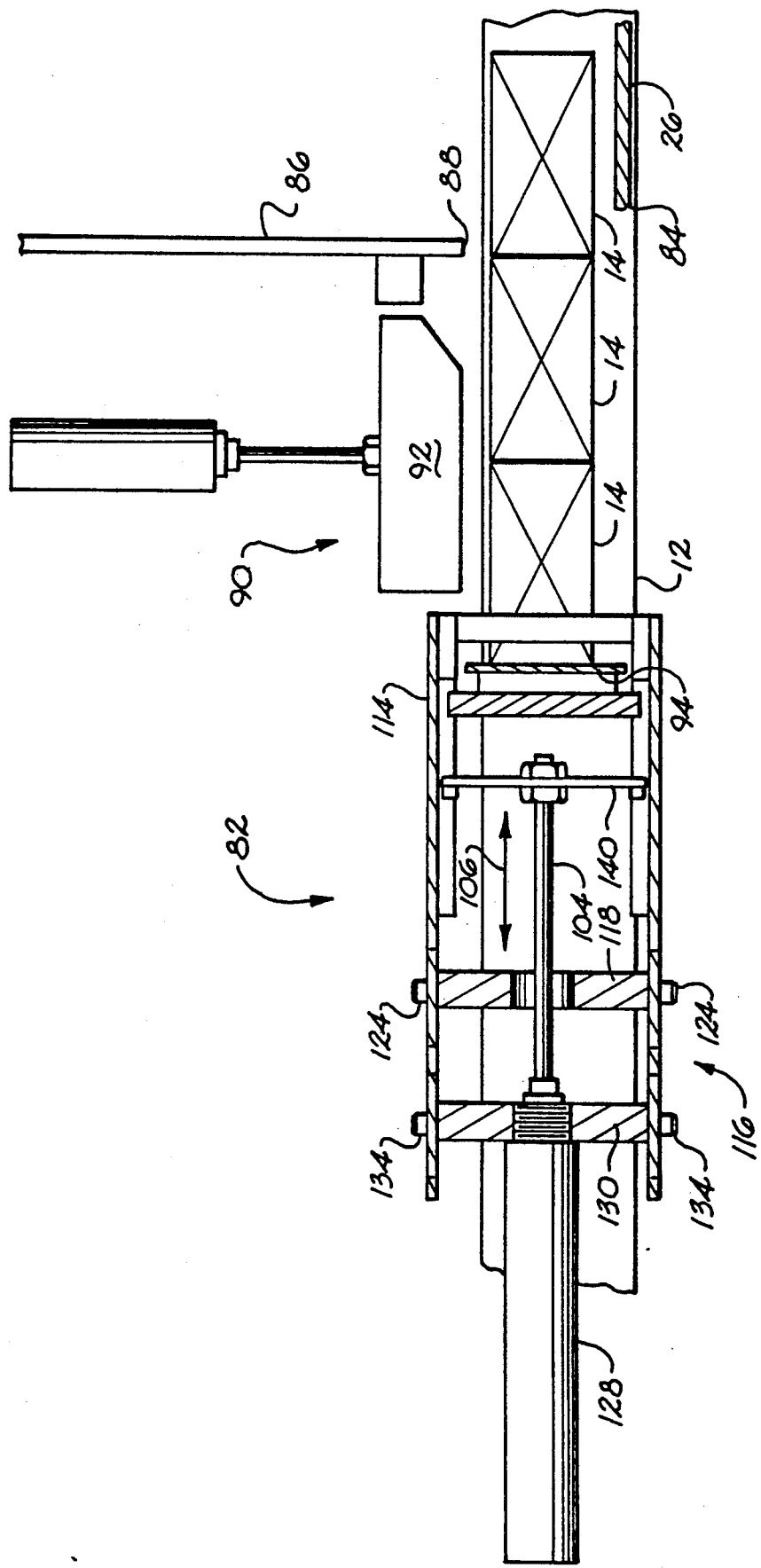
FIG. 5 is a partial section, top view of the apparatus of FIG. 4 further illustrated in combination with an exemplary conveyor and associated products with which such apparatus may be practiced.

FIG. 5 of the '718 patent illustrates in generally side elevational view (diagrammatical form) certain features of one accumulator apparatus 212 which may be used in accordance with this invention and association with conveyor belt means 210. Distal edges 222 of flights or veins used in the vertical conveyor portion of apparatus 212 have respective infeed end edge 224 and outfeed end edge 226. Upstream from infeed edge 224 are situated infeed brake means 232 (which may be a clamping pad or stop block similar to block 118 of FIGS. 3 and 4 of the '718 patent, though such specific block is in such patent actually an example of an outfeed stop block). FIGS. 1 and 2 of the present application illustrate infeed pinchless product stop or trapping means or infeed product engagement apparatus which may be used relatively upstream from an accumulator means, such as in place of infeed brake means 232 of FIG. 5 of the '718 patent.

FIG. 5 of the '718 patent also illustrates locator means 242 situated relatively downstream from outfeed end edge 226. Such locator means 242 may comprise a retractable device with a controllable mechanism for relatively slightly shifting queued products in a downstream direction, such as the exemplary construction of FIG. 6 of the '718 patent. In accordance with present features, such locator means 242 may be advantageously replaced with output shift means or outfeed product engagement apparatus as illustrated in present FIGS. 4 and 5.

Particulars of the foregoing present apparatus and features are set forth hereinbelow with reference to present application FIGS. 1 through 5.

FIGS. 1 and 2 illustrate an exemplary construction of infeed pinchless product stop means or trapping means generally 10 in accordance with this invention. FIG. 1 is generally an isolated, perspective view of infeed stop means 10 while FIG. 2 is a generally top plan view in somewhat diagrammatical form to illustrate the relationship of such features with a conveyor belt means 12 or the like, and products 14 carried thereon. The downstream direction of advancement for conveyor 12 is generally represented by arrow 16.

In general, operation of infeed pinchless product stop means 10 is such that the leading edge of a next approaching product is interrupted without interruption of the travel of any product whose leading edge has already passed by such infeed stop means. Such aspects of this invention will be discussed in greater detail below with reference to FIG. 6. It will also be apparent from the remainder of the disclosure that operation of infeed stop means 10 results in selected product engagement as described above, but without application of any clamping force to such product or to any other products moving along conveyor 12.

While various embodiments and constructions may be practiced in accordance with such features of the invention, it is preferred that infeed product engagement apparatus 10 be provided for use along a conveyor such as 12 forming a pathway 18 (having a full width corresponding with the width of conveyor 12). Such conveyor moves in a defined downstream direction 16 between two workstations (such as the exemplary workstations 214 and 216 of FIG. 5 of the '718 patent) and feeds products through an accumulator means (for example, apparatus 212 of such FIG. 5 of the '718 patent) of the type which controllably removes a queue of products from the conveyor whenever there is a backup of products within such accumulator means.

Present FIG. 2 partially represents successive product queues 20 and 22 which have been previously removed from conveyor 12. In such accumulator means, a guide member 24 (see present FIGS. 1 and 2) is provided relatively adjacent the outfeed and infeed edges of extending flights or veins so as to prevent products from escaping or sliding out at such ends. FIG. 1 represents an exemplary flight member 26 in dotted line while FIG. 2 represents such in cross section. As understood by those of ordinary skill in the art, a plurality of such flights extend generally along the length of the accumulator means, and products are removed from the conveyor by being captured between adjacent rows of such flights. Alternatively, by reversing the rotational flow of the vertical mechanism, such flights may be used to return a row of previously removed products to the conveyor.

As the infeed edge 28 of the flight member 26 is swept passed guide member 24, any product which extends upstream from edge 28 to the point of contacting edge 30 of member 24 is subject to damage. In other words, such edge 30 of guide member 24 becomes a product shear point. Of course, upstream edge 28 of flight 26 may also be thought of as being a product shear point if a product extends along conveyor 12 so as to just barely engage or overlap such edge 28. In either event, the present invention is operative to ensure that products are positively advanced downstream from such edge 30 of guide member 24, and preferably much closer to edge 28 of flight 26, so as to positively eliminate product shear point damage during accumulator operations. While such positive advancement of an adequate downstream distance is being accomplished in accordance with this invention, additional products upstream from the accumulator are being stopped (preferably in accordance with other features of this invention).

As represented in present FIGS. 1 and 2, the infeed product engagement apparatus or infeed stop or trapping means 10 preferably includes first and second members generally 32 and 34, respectively, and which are operative on opposite lateral sides of conveyor 12. First member 32 in this particular exemplary embodiment comprises a stop plate which is injected across a limited portion (represented by dotted line portion 36 of present FIG. 2) of the conveyor 12 such that a space remains which is larger than the nominal width 38 of an advancing product 14. The length of such product 14 is the dimension thereof in the direction of arrow 16 and perpendicular to such width 38, while the height thereof is the third dimension above conveyor 12 and perpendicular to both the direction of arrow 16 and the width 38.

Second member 34 is relatively upstream from first member 32 (as illustrated in both present FIGS. 1 and 2) and in this exemplary construction comprises a deflector guide which is injected across a limited portion of the conveyor, likewise such that a space remains which is larger than the nominal product width 38. However, the injection of second member 34 causes products striking the deflector guide surface 40 thereof to move to a portion of the conveyor so that the leading edge of any such guided products subsequently engage the stop plate 32 (in the dotted line position 36 thereof).

Preferably, both members 32 and 34 are respectively piston actuated by their own associated pistons 42 and 44, or equivalents thereof. Such pistons may be pneumatically operated, or by other equivalent means, and preferably are commonly controlled so as to be simultaneously actuated.

As the exemplary sliding stop plate 32 is slidingly actuated, it forms part of interruption means in accordance with this invention for selectively interrupting product travel in at least a first part of the moving pathway 18 of the conveyor 12 situated relatively upstream from the accumulator means. In fact, the upstream side of plate 32 (in the dotted line position 36 thereof) establishes a trapping point in accordance with this invention.

The arrangement in present FIG. 3 illustrates generally means 46 in accordance with this inventions for translating motion of piston 42 in the general vertical axis 48 to motion in the desired horizontal direction 50 for such plate 32. Specifically, plate 32 may carry a projecting pin 52 thereon, which pin is received in an angled or diagonal slot 54 formed in a moving block 56 which is mounted on the lower end of piston 42. By way of further example, it is illustrated that such block 56 may travel in a channel 58 as formed by further housing or block 60 associated with such interruption means generally 62 in accordance with this invention.

FIG. 3 further represents sliding movement of plate 32 between one position thereof illustrated in solid line and in another alternate position thereof illustrated in dotted line. Of course, other drive mechanisms for such a plate, or other forms of stop members may be practiced. However, the perpendicular related drive arrangement of such FIGS. 1 through 3 for interruption means 62 advantageously limits the amount of space in or next to an accumulator which is required for achieving the illustrated function.

Also, as is discussed in greater detail hereinafter, the use of a plate-like member results in the provision of an interruption device which projects in the manner of a finger or similar structure resulting in minimal lateral contact to any product 14 whose leading edge has already passed the trapping point formed with such means. As will be further appreciated hereinafter, if the edge 64 of plate 32 strikes the lateral side of a product 14, such product will merely slide past the edge of plate 32 and continue along the moving pathway 18 of conveyor 12, without any clamping or pinching force applied thereto.

Guide means generally 66 are formed in association with guiding member 34 and its associated drive structure. Generally, such guide means are situated relatively upstream from the interruption means 62, and are operative for selectively guiding products 14 carried on the conveyor 12 into the pathway first part (i.e., that portion of the conveyor pathway which is interrupted by plate 32 when it is in its extended position 36). In such fashion, downstream movement in the direction of arrow 16 of such guided products is subsequently interrupted by contact with plate 32 in the dotted line position 36 thereof (see present FIG. 2).

With further reference to such present FIG. 2, it is well illustrated that piston 44 and its associated drive mechanism 68 are preferably arranged for alternate and controlled movement of guiding member 34 generally along the direction of horizontal arrow 70 (see FIG. 1). The solid line illustration of present FIG. 2 illustrates guiding member 34 in a relative retracted position thereof while the dotted line illustration 34' in present FIG. 2 shows the fashion in which an exemplary product 72 may be moved towards a part of the conveyor by angled surface 40' so that subsequent downstream movement of such guided product 72 results in such product being trapped by and engaged against surface 36 of plate 32. Likewise, while a preferred wedge-shaped member 34 has been illustrated, those of ordinary skill in the art will appreciate that other flat or curved surfaces or other configurations of elements may be suitably used and controlled for selectively performing such guide means operation.

It will be further apparent from present FIGS. 1 and 2 that a fixed deflector means 74 may be provided mounted relatively downstream from the movable stop member 32 and extending into a portion of the conveyor pathway 18 which becomes uninterrupted whenever the movable stop member 32 assumes a defined first position thereof (i.e., the solid line position of member 32 as in present FIG. 2). In such instance, fixed deflector means 74 would be operative for deflecting products away from the lateral edge 76 of the conveyor pathway to which the movable stop member 32 is adjacent (i.e., closer than the opposite lateral edge 78). As best illustrated in present FIG. 2, an example of such a product would be product 72. In general, products tend to travel in relatively straight lines in the direction of arrow 16 once a lateral position of the product has been established on conveyor 12. If plate 32 became retracted after guide 34 had moved product 72 towards lateral edge 76, other fixed or movable features of the accumulator means, such as edge 28 of flight 26, could interfere with the travel of product 72 were it not for the function of fixed deflector means 74.

It should also be apparent from FIG. 2 that an adequate distance remains between such lateral edge 76 and the further most extended edge 80 of such guide member 34 that product 72 does not become pinched nor clamped in any way by guide means 66. Hence, product 72 will with certainty continue to advance towards either plate 32 in position 36 thereof, or the fixed deflector means 74.

While the general features and component interactions of the subject invention are intended as being illustrated in the accompanying figures, it is not necessarily intended that all such illustration is to scale or with the same spacing as would exist in a given specific embodiment of the invention. However, it is intended to represent, particularly in conjunction with the subject discussion thereof, that the infeed product engagement apparatus 10 in effect traps a correct or appropriate product at the infeed of an accumulator means so that (in conjunction with an appropriate downstream shift as described hereinafter) an appropriate number of products as will safely fit into flights 26 or otherwise be accommodated therein will be removed from conveyor 12 without any shear point interference at edge 30 of guide 24 or at edge 28 of flight 26. It is also intended that the present figures illustrate and represent in general the features of the subject invention that apparatus 10 provides a pinchless configuration, i.e., that such does not result in the application of any clamping or pinching force to products being trapped thereby or permitted to pass thereby or therethrough.

Turning now to additional features of the subject invention, present FIGS. 4 and 5 illustrate in perspective view (with partial cutaway) and sectional view, respectively, outfeed product engagement apparatus or output shift means generally 82 in accordance with the subject invention. As referenced above, locator means 242 of FIGS. 5 and 6 of the '718 patent may be advantageously replaced in accordance with the subject invention by the structure of present FIGS. 4 and 5. In such present FIGS. 4 and 5, a conveyor 12 may again be associated with flights 26 of an accumulator means, which flights have a downstream edge 84 which is relatively just upstream from a guide member 86 which holds products into the downstream ends of such flights. Potential product shear points exist at edge 84 and at edge 88 of flight 86, in a similar fashion as was discussed about with reference to edges 28 and 30 of present FIGS. 1 and 2. While the method and apparatus of the '718 invention inherently avoided such shear points in many instances, the present invention is intended to affirmatively and positively avoid such shear points at both the outfeed and infeed ends of the accumulator device in all instances.

The mechanism generally represented by reference character 90 in present FIGS. 4 and 5 basically comprises an outfeed brake means, which may be identical to the construction represented by outfeed brake means 234 in FIG. 5 of the '718 patent, and as represented by actuator 114 and block member 118 of FIGS. 3 and 4 of the '718 patent. As will be understood by those of ordinary skill in the art, block 92 may be used in order to apply a controlled amount of clamping force to the products 14. Such outfeed brake means 90 may be used in the practice of methodology as in the '718 patent, wherein products are held from emerging beyond such outfeed brake means until previously released products or selected groupings of products have cleared a relatively downstream sensing point. Alternatively, the subject invention may be practiced with accumulators which do not operate in accordance with such specific features as those contained in the subject matter of the '718 patent.

Outfeed product engagement apparatus 82 of the subject invention includes a controllable product engagement member 94, engagement actuation means generally 96 and shift actuation means generally 98.

More specifically, the controllable product engagement member 94 may controllably assume first, second, and third positions thereof. The solid line illustration in present FIG. 4 represents the defined first position (i.e., extending) of engagement member 94. The engagement actuation means 96, which may operate with a first piston 100 operative in a generally vertical axis 102 perpendicular to the conveyor pathway, selectively positions the product engagement member 94 between the first position thereof (as illustrated) relatively just downstream from the accumulator means and relatively adjacent the conveyor 12 so as to stop the movement of products 14 along the pathway thereof, and the second position thereof. The second selected position which may be effected by engagement actuation means 96 is accomplished by retracting or withdrawing piston 100 so as to displace member 94 (preferably upwardly) from the conveyor an adequate distance so as to not contact any products thereon.

Shift actuation means 98 is operative for selectively shifting the product engagement member 94 with products received thereagainst between the above-referenced first position thereof and a third position thereof (i.e., shifted) relatively adjacent the conveyor so as to stop the movement of products therealong and downstream from the first position by a total shift distance. Preferably such total shift distance is comprised of a predetermined minimum shift distance added to the nominal length of an individual product being moved on the conveyor. Such shift actuation means is preferably operable while feeding of products into the upstream end of the associated accumulator means is being controlled. Through such operations, products to be removed from the conveyor with the accumulator means may be controllably shifted relative thereto prior to such removal so as to prevent product shear points between the accumulator means and such products and between the accumulator means and products remaining on the conveyor.

Such shift actuation means 98 is preferably actuated with a second piston 104 for movement in a generally horizontal axis 106 parallel to the conveyor pathway, with such second piston when extended placing the product engagement member 94 in the first position thereof, and when retracted placing the product engagement member 94 in the third position thereof.

Also, the first and second pistons 100 and 104 may be (though are not required to be) simultaneously actuated for simultaneous movement of the product engagement member 94 along two axes. Such two axes movement particularly provides smooth action when the first piston is being retracted. The first piston 100 may also include at least one pivotable mounting such as 108 relative the product engagement member 94 so as to permit user-selected adjustment of the location of the first position relative an accumulator means downstream end, as discussed hereinafter. Alternative to the pivotable mounting 108, mounting of the opposite end of the drive actuator 110 for piston 100 may be pivotably mounted through a member (not shown) bolted with bolts 112 or the like at an upper portion of the housing 114. Such housing 114 may, if desired, be attached to or otherwise carried on an accumulator apparatus as illustrated with respect to housing 36 of FIG. 1 of the '718 patent.

The shift actuation means 98 may include shift adjustment means generally 116 for user-selected adjusting of the total shift distance. For example, such shift adjustment means may include an adjustable stop member 118, the user-selected position of which establishes the third position of the product engagement member 94, so that a user may selectively adjust the total shift distance. In other words, a top slot 120 and bottom slot 122 may be provided in each lateral side of housing 114 for cooperation with corresponding bolts or the like 124 in corresponding bolt holes 126 of such stop member 118. Not all of such slots are illustrated in FIG. 4 since housing 114 is shown in partial cutaway. By selective loosening and tightening of such bolts or the like, the position of block 118 may be adjusted along the direction of axis 106. By providing a stop member for retraction of piston 104 during operation of an actuator 128, the third position (i.e., shifted position) of product engagement member 94 may be selectively and readily adjusted.

As an additional feature of the subject invention, first position adjustment means are provided for user-selected adjusting of the position of the controllable piston actuator 128, so that a user may selectively adjust the product engagement member first position. For such function, an additional mounting block 130 having a fixed relationship with piston actuator 128 may be outfitted with a similar adjustment arrangement as used in connection with block 118. In other words, either in the same slot 120 or a separately formed slot 132 and other corresponding slots, bolts 134 may cooperate with corresponding threaded holes or openings 136 on each lateral side of block 130 so that the position of such block may be adjusted relative housing 114. As illustrated by the remaining connections, the first position of member 94 may thereby be adjusted, in which case the generally vertical axis 102 of piston 100 will become slightly tilted to accommodate such adjustments. Contact type (non-fixed). Drive connection (for clarity, not shown in its entirety but well understood to those of ordinary skill in the art) should be effected between piston 104 and engagement member 94 because of the products received thereagainst. Similarly, an exemplary opening 138 is defined in 118 for the passage of such piston 104 therethrough, block 118 forming a stop member against which the travel of an end member 140 is interrupted.

While the foregoing discussion of FIGS. 1 through 5 discloses in detail present apparatus as it may be separately provided with respect to each other, and as in combination with an exemplary accumulator apparatus as in the '718 patent, or other forms of apparatus for accumulator operations, the following description is more specifically related to the present methodology. Such methodology may also be practiced in combination with the subject matter disclosed in the '718 patent, or otherwise with different accumulators.

Figure 6:
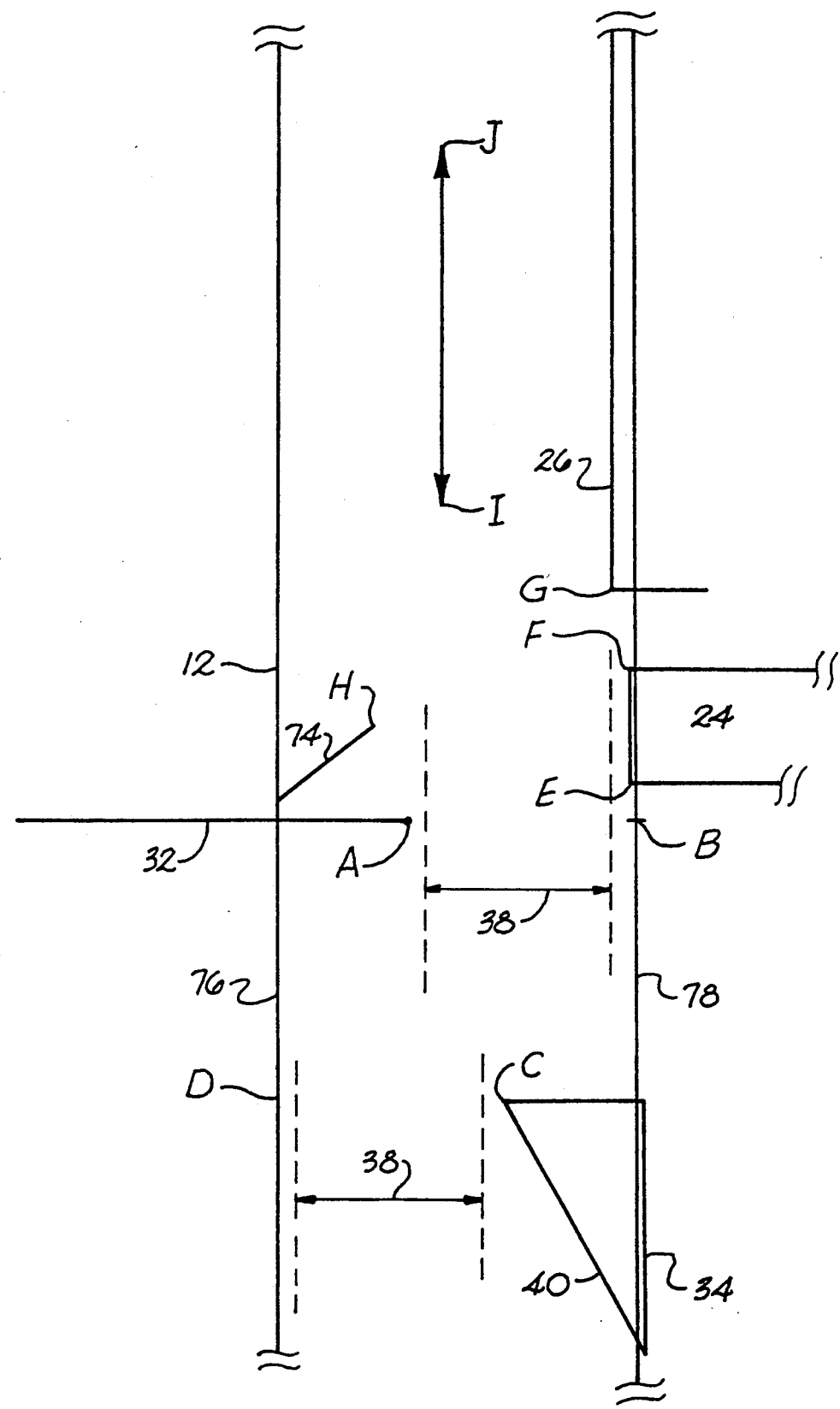
FIG. 6 is an exemplary top diagrammatical view of exemplary apparatus in accordance with the subject invention, provided to facilitate discussion of the present methodology.

Referring now to FIG. 6, additional details of present methodology will be explained. In particular, FIG. 6 is intended to represent in diagrammatical form only a top view of an infeed section relative an accumulator, in accordance with the present features. The relative motion and detailed construction of the various indicated members are discussed in greater detail above with reference to FIGS. 1 through 3. Accordingly, such construction details are omitted in FIG. 6 for greater clarity. However, corresponding reference characters as in such FIGS. 1 through 3 are used for convenience in relating such subject matter to present FIG. 6.

In FIG. 6, engagement member plate 32 and guide member wedge 34 are represented in their actuated positions respectively. In other words, the leading edge A of plate 32 is extended so as establish an infeed trapping point thereat, and situated along the conveyor 12 a predetermined distance upstream from the accumulator device infeed, which infeed generally may be regarded as comprising that portion of the apparatus downstream from the infeed guide (i.e., downstream from infeed guide 24 point F). The distance between point A and the lateral side 76 of conveyor 12 constitutes the first part of the conveyor pathway. Point C on guide member 34 is similarly displaced from its associated lateral edge 78 of conveyor 12. In each instance of members 32 and 34, the remaining width of the conveyor pathway is greater than the nominal width 38 of products being carried on conveyor 12. In other words, the distance from points A to B and the distance from points C to D is respectively greater than the nominal width 38. It should be apparent to those of ordinary skill in the art that point D is the point on lateral side 76 of conveyor 12 which is directly opposite the furthermost extended point C of member 34, while point B is the point on lateral side 78 of conveyor 12 which is directly opposite the furthermost extended point A of member 32.

Dimensionally, stop member 32 projects beyond lateral side 76 so that point A is approximately 3/8 or ½ of an inch (preferably) beyond lateral side 76. The projecting distance of point A is adequate so that the inclined surface or wedge 40 of member 34 causes a package to be deflected into and trapped at a position adjacent to point A. As such trap is established (i.e, such trapping means actuated), the outfeed apparatus in accordance with this invention is operative to shift the queued products relatively downstream by an adequate or predetermined distance, which is diagrammatically represented by the line from point I to point J on present FIG. 6. In general, such distance is intended to be at least as great as the nominal length of an individual product carried on conveyor 12. More preferably, the shift distance comprises approximately 150 percent or 160 percent of such nominal product length, though a broader range such as from generally about 1.3 times to about 1.7 times the length of the nominal product length may also be practiced.

Another manner in which such adequate downstream shift distance may be determined in accordance with features of this invention is by adding the equivalent of the nominal length of an individual product being advanced along conveyor 12 to the distance along conveyor 12 between points A and G. Such distance in one preferred embodiment may be about 4 centimeters, though a range of distances may be practiced in accordance with this invention, such as including from about 3 centimeters to about 10 centimeters. It is also preferred that the shift adjustment means described above should be operated by a user to accommodate changes in nominal product length being used in a given arrangement, or to accommodate the specific distance in the conveyor direction from point A to point G of FIG. 6. The critical dimension is for the adequate distance to comprise the nominal length of one product plus at least the distance in the conveyor direction from point A to point F of FIG. 6, so that in accordance with this invention the interference point F will be avoided.

Subsequent to such relative downstream shifting, a reverse shift operation may be performed in accordance with the method and apparatus disclosed in the '718 patent. Additional details of such features are set forth in such patent, fully incorporated by reference.

Returning once again to FIG. 6, it may be noted by way of summary that the distances between points C and D, between points A and B, and between points A and C are all intended as being greater than the nominal width 38 of each individual product 14 advanced along conveyor 12. In such fashion, the apparatus 10 in accordance with this invention prevents the occurrence of any pinch points, i.e., accomplishes the desired trapping operations without applying any clamping force to any products. Similarly, situation of the downstream deflector means 74 for operation whenever plate 32 is retracted makes certain that any subsequent product travel is adequately removed from lateral side 76 so as to avoid interference with any other members of the accumulator which may be adjacent to such lateral edge.

By operating the subject apparatus in accordance with this invention, the downstream shift amount preferably of approximately 150 to 160 percent of the nominal length of a product in combination with trapping an appropriate product (i.e., the next adjacent product whose leading edge has not yet reached point A), the maximum safe amount of products may be removed with operation of an accumulator (rather than a specific fixed number of such products) without the occurrence of any product shear points damage. In other words, the subject invention automatically compensates for any and all variations in package size, without requiring excessively complex apparatus or methodology for operation. Even if products become tipped, the transfer represented by the distance between points I and J (not intended as being to scale) is adequate to eliminate the potential for interference at point F of FIG. 6. While in some instances of practicing the present invention products will be advanced completely inside the flights (i.e., beyond point G of FIG. 6) it is acceptable in general for a portion of the product to extend upstream from point G so long as there is no interference at point F.

Those of ordinary skill in the art will likewise appreciate that such methodology of the subject invention may be operated with a variety of components and devices, not limited to the exemplary embodiments thereof as illustrated herewith. It will also be appreciated that the complete adjustability and variation of the outfeed apparatus generally 82 as represented in present FIGS. 4 and 5 permit the user to arrange and establish the present method and apparatus for operation with a variety of products. For example, the aseptic paper packages discussed above may come in a variety of sizes, for example having lengths from about 1½ inches to about 3 inches. Other products and other sizes thereof may also be used during practice of the subject invention.

Those of ordinary skill in the art will also appreciate that the present invention is operative with all such devices as disclosed herewith or equivalents thereof, or others, which provide for an adequate downstream shift operation in conjunction with the above-described trapping function. With such trapping function, the product whose leading edge has not yet reached point A is permitted to pass by such point so as to also advanced adequately downstream to avoid interference at point F. In a worst case scenario, a product leading edge will just miss point A (i.e.. be just downstream therefrom whenever a product removal sequence is initiated). Even in such circumstance, in accordance with this invention such product is advanced one full product length thereof and an additional amount, preferably the conveyor direction distance from points A to point F (and more preferably from point A to point G), so that even in such worst case scenario such product avoids interference with point F of FIG. 6. Utilization of a positive clamping action would not permit the same advantageous results in all situations.

It should be further understood to those of ordinary skill in the art that additional features of accumulator devices, such as those described in the '718 patent, may be practiced in combination with all of the foregoing present features. For example, an accumulator device may include a movable transfer plate such as disclosed in the '718 patent, and may include product return operations as discussed in such patent.

It should be further understood by those of ordinary skill in the art that the foregoing presently preferred embodiments (both method and apparatus) are exemplary only, and that the attendant description thereof is likewise by way of words of example rather than words of limitation and their use do not preclude inclusion of such modifications, variations, and/or additions to the present invention which would be readily apparent to one of ordinary skill in the art, the scope of the present invention being set forth in the appended claims.

What is claimed is:

1. A method of surge control for products being transported via a moving conveyor belt means in a predetermined downstream direction between two production areas, said method comprising:

providing an accumulator device with an upstream infeed and a downstream outfeed, and situated alongside the conveyor belt means intermediate the two production areas so that one of such areas is upstream of the accumulator device infeed and the other production area is downstream of such device outfeed, such accumulator device being capable of controllably removing products from the conveyor belt means if there is a back-up of products being fed to the downstream production area; and controllably removing products from the conveyor belt means with the accumulator device if a queue of products develops within the accumulator device between the outfeed and infeed thereof; wherein said removing step includes establishing an infeed trapping point and engaging the leading edge of any product transported thereagainst by the conveyor belt means, such trapping point being situated along the conveyor belt means a predetermined distance upstreawm from the accumulator device infeed;

relatively shifting the queue of products an adequate distance downstream such that all products downstream of the infeed trapping point and not engaged thereat are transported downstream at least to the accumulator device infeed, so that products are removed undamaged from the conveyor belt means by the accumulator device regardless of the relative position of products at the device infeed whenever the removing step commences;

wherein said engaging step includes partially restricting the product path on the conveyor belt means without applying any clamping force to the products, and wherein said engaging step further includes injecting an engagement member partially into the product path such that adequate width remains for products to pass by said engagement member if the leading edge of such products has already passed thereby, while upstream from said engagement member guiding products relatively upstream on the conveyor belt means toward such engagement member so as to be engaged thereby.

2. A method as in claim 1, wherein said predetermined distance generally falls in a range from about 3 centimeters to about 10 centimeters.

3. A method as in claim 1, wherein said adequate distance is selected to be greater than at least the nominal length of the individual products being transported via the conveyor belt means.

4. A method as in claim 3, wherein the nominal product length generally falls in a range from about 4 centimeters to about 8 centimeters.

5. A method as in claim 3, wherein said adequate distance is selected to be generally about the nominal product length added to said predetermined distance.

6. A method as in claim 3, wherein said adequate distance is user-selected, and falls generally in a range from about 1.3 times to about 1.7 times the nominal product length.

7. A method of surge control for products being transported via a moving conveyor belt means in a predetermined downstream direction between two productions areas, said method comprising:

providing an accumulator device with an upstream infeed and a downstream outfeed, and situated alongside the conveyor belt means intermediate the two production areas so that one of such areas is upstream of the accumulator device infeed and the other production area is downstream of such device outfeed, such accumulator device being capable of controllably removing products from the conveyor belt means if there is a back-up of products being fed to the downstream production area; and controllably removing products from the conveyor belt means with the accumulator device if a queue of products develops within the accumulator device between the outfeed and infeed thereof; wherein said removing step includes establishing an infeed trapping point and engaging the leading edge of any product transported thereagainst by the conveyor belt means, such trapping point being situated along the conveyor belt means a predetermined distance upstream from the accumulator device infeed, relatively shifting the queue of products an adequate distance downstream such that all products downstream of the infeed trapping point and not engaged thereat are transported downstream at least to the accumulator device infeed, so that products are removed undamaged from the conveyor belt means by the accumulator device regardless of the relative position of products at the device infeed whenever the removing step commences, wherein:

said engaging step includes injecting an engagement member partially into the product path such that adequate width remains for products to pass by said engagement member if the leading edge of such product has already passed thereby, and upstream therefrom guiding products relatively upstream on the conveyor belt means towards such engagement member so as to be engaged thereby;

said predetermined distance is generally no greater than about 1.7 times the nominal length of products being transported via the conveyor belt means; and said adequate distance is user selected, and falls generally in a range from about 1.3 times to about 1.7 times the nominal product length, so that products are shifted generally about one nominal product length and about such predetermined distance.

8. A method as in claim 7, wherein:

said accumulator device includes a generally vertical conveyor mechanism with a plurality of spaced, outwardly extending veins thereon for the accumulation of products between adjacent such veins;

said removing step includes indexing such vertical conveyor mechanism so as to remove products from the conveyor belt means; and said method further includes the step of selectively returning products to the conveyor belt means which were previously removed therefrom with the accumulator device, whenever no products are within such accumulator device on the conveyor belt means.

9. A method as in claim 8, wherein:

said method further includes the step of selectively holding back all products emerging from the downstream end of the accumulator device during normal running operations so as to maintain a predetermined distance gap between each predetermined number of products moving towards the downstream production area from the accumulator device downstream end, by ensuring the presence of said predetermined distance gap before the release of a subsequent said predetermined number of products; and wherein said removing step includes removing products if the queue of products develops within the accumulator device before the predetermined distance gap occurs between products emerging from the accumulator device downstream end.

10. A method as in claim 8, further including the step of providing the accumulator device with a movable transfer plate operatively situated relative the conveyor belt means and the distal ends of the accumulator device outwardly extending veins, and including the step of controlling the position of such movable transfer plate during product removing and returning operations so as to prevent the occurrence of lateral shear points for the products as they are moved in alternate directions.

11. A method of controlling the flow of products advancing along a conveyor from a first workstation to a second workstation, including the temporary accumulation off-line of excessive numbers of such products queued up between the two workstations, such method including:

providing an apparatus adjacent the conveyor between the two workstations, and having accumulator means for selectively alternatively removing and returning groups of products relative such conveyor, such apparatus having an infeed side receiving products from the first workstation upstream therefrom, and an outfeed side from which products emerge on their way to the second workstation downstream therefrom, said accumulator means being situated generally between such apparatus infeed and outfeed sides, with resulting potential product shear points established between said accumulator means and said infeed and outfeed sides, respectively;

establishing an infeed product trapping point adjacent the conveyor upstream from the accumulator means infeed side shear point;

preventing all products from leaving the apparatus outfeed side during normal running operations until predetermined numbers of products previously released therefrom have passed a sensing point along the conveyor a predetermined distance downstream towards the second workstation from the apparatus, so as to maintain a predetermined distance gap between predetermined numbers of products emerging from the apparatus outfeed side; and initiating a product removal sequence if the preventing step results in a queue of products extending through the apparatus from the outfeed side thereof back to the infeed side thereof;

wherein such product removal sequence includes setting a trap at the trapping point for the leading edge of the next product approaching the trapping point from the direction of the first workstation; relatively shifting the products within the apparatus queue an adequate distance downstream such that products any portion of which are downstream from the trapping point are shifted beyond the accumulator means infeed side shear point while products upstream from the trapping point become trapped thereat; and thereafter operating the accumulator means for removing products from the conveyor within the apparatus, so that such products are isolated from line pressure along the conveyor and positively directed past potential product shear points regardless of their initial position, so as to prevent shear point damage thereto during their removal; wherein:

setting said trap includes injecting a stop member across part of the conveyor, with the remaining width of the conveyor being greater than the nominal width of individual products advancing along the conveyor, such that products laterally struck by such stop member continue thereby while a product whose leading edge strikes such stop member is trapped thereby; and said adequate distance downstream is generally a user-established distance which is greater than the nominal length of individual products advancing along the conveyor.

12. A method as in claim 11, wherein:

setting said trap includes injecting a guide member across part of the conveyor relatively upstream from the stop member so as to guide products upstream therefrom into subsequent leading edge engagement with such stop member so as to be trapped thereby; and said adequate distance downstream is generally in a range from about 1.3 times to about 1.7 times the nominal product length.

13. A method as in claim 12, wherein setting said trap includes deflecting products just downstream from said stop member away from a lateral edge of the conveyor closer to said stop member, to compensate for operation of said guide member on nontrapped products.

14. A method as in claim 12, wherein:

the accumulator means includes a generally vertical escalator-type device having a traveling belt with a plurality of outwardly extending members thereon forming flights, between which groups of products may be located and accumulated off-line of the conveyor;

said apparatus further includes outfeed brake means for selectively stopping the flow of products at the outfeed side of the apparatus; and wherein said method further includes returning to the conveyor products previously removed therefrom whenever there are no products between the infeed and outfeed sides of the apparatus.

15. A method as in claim 12, wherein the products comprise aseptic paper containers, the first workstation comprises a filler machine, and the second workstation comprises one of a straw-applicator and a packing machine, and wherein the preventing step includes releasing products in groups of a predetermined number.

16. A method of surge control for products being transported via a moving conveyor belt means between two production areas, said method comprising:

providing an accumulator device alongside the conveyor belt means intermediate the two production areas so that one of such areas is upstream of the accumulator device and the other production area is downstream of such device, such device being capable of controllably removing products from the conveyor belt means if there is a backup of products being fed to the downstream production area; and controllably removing products from the conveyor belt means with the accumulator device if a queue of products develops within the accumulator device before products emerging from the accumulator device can advance towards the downstream production area; wherein said accumulator device includes a generally vertical conveyor mechanism with a plurality of spaced, outwardly extending veins thereon for the accumulation of products between adjacent such veins, said removing step includes indexing such vertical conveyor mechanism so as to remove from the conveyor belt means a line of products queued within the accumulator device to form a slug of products extending generally along the length of the vertical conveyor mechanism; and wherein said accumulator device further includes an outfeed shift mechanism, relatively just downstream from the downstream edges of the plurality of outwardly extending veins, and with operation of which products to be removed with the accumulator device are permitted to shift relatively downstream a preselected total distance during the removing step prior to indexing of the vertical conveyor mechanism, while the flow of other products approaching the accumulator device is stopped, such preselected total distance comprising the length of one product carried on the conveyor belt means added to a predetermined fixed distance, so that product shear points are positively prevented at the downstream and upstream edges of the veins during the removing step regardless of initial product positions along the conveyor belt means.

17. A method as in claim 16, further including:

selectively holding back products emerging from the downstream end of the accumulator device so as to maintain a predetermined distance gap between adjacent products or predetermined groups of products moving towards the downstream production area; and wherein said removing step includes removing products from the conveyor belt means if the queue of products develops within the accumulator device before the predetermined distance gap occurs between products or said predetermined groups of products emerging from the accumulator device; and wherein said method further includes retaining at least one product immediately adjacent said outfeed shift mechanism during the removing step, and thereafter moving such retained product relatively upstream so as to reestablish the predetermined distance gap to be maintained, which gap is otherwise diminished whenever products are initially permitted to shift relatively downstream against said outfeed shift mechanism.

18. A method as in claim 16, further including infeed trapping means, located upstream from the accumulator device by generally about said predetermined fixed distance, for stopping the next product situated upstream therefrom and whose leading edge has not yet reached such infeed trapping means, so that said infeed trapping means is operative to stop such product without the application of any clamping force thereto or to any other products transported via the conveyor belt means.

19. A method of controlling the flow of products advancing along a conveyor from a first workstation to a second workstation, including the temporary accumulation off-line of excessive numbers of such products queued up between the two workstations, such method including:

providing an apparatus adjacent the conveyor between the two workstations, and having accumulator means for selectively alternately removing and returning groups of products relative such conveyor, such apparatus having an infeed side receiving products from the first workstation upstream therefrom, and an outfeed side from which products emerge on their way to the second workstation downstream therefrom, said accumulator means being situated generally between such apparatus infeed and outfeed sides;

preventing products from leaving the apparatus outfeed side until products previously released therefrom have passed a sensing point along the conveyor a predetermined distance downstream towards the second workstation from the apparatus, so as to maintain a predetermined gap between products emerging from the apparatus outfeed side; and initiating a product removal sequence if the preventing step results in a queue of products extending through the apparatus from the outfeed side thereof back to the infeed side thereof;

wherein such product removal sequence includes interrupting the flow of further products into the apparatus infeed side by pinchless entrapment of a product leading edge approaching a selected trapping point upstream from said accumulator means; relatively shifting the products within the apparatus queue a preselected total distance in the downstream direction; and thereafter operating the accumulator means for removing products from the conveyor within the apparatus, so that such products are isolated from line pressure along the conveyor by such interrupting and shifting steps, to prevent shear point damage thereto during their removal;

wherein the accumulator means includes a generally vertical escalator-type device having a traveling belt with a plurality of outwardly extending members thereon forming flights, between which groups of products may be located and accumulated off-line of the conveyor, and wherein said apparatus further includes infeed pinchless product stop means and outfeed brake means, for selectively interrupting the flow of products at the infeed and outfeed sides, respectively, of the apparatus; and wherein the shifting step includes situating an adjustable outfeed shift member in the flow path of products along the conveyor at a selected point relatively just downstream from the outfeed brake means, and thereafter releasing the outfeed brake means to permit the queue of products extending through the apparatus to shift downward into engagement with such outfeed shift member in a downstream shifted position thereof, such that such products are shifted downstream by said preselected total distance which corresponds with the length of one of such products added to a predetermined fixed distance, so that products upstream thereof may be cleanly removed from the conveyor without shear point damage to the products.

20. A method as in claim 19, wherein:
said infeed pinchless product stop means is located upstream from the accumulator means by about said predetermined fixed distance, and operates to interrupt the next approaching product leading edge without interrupting the travel of any product whose leading edge has already passed by such infeed stop means;

the nominal length of individual products being advanced along the conveyor at a given time falls generally within a range of from about 1½ inches to about 3 inches; and the downstream shifting distance of the outfeed shift member is adjusted to accommodate the nominal product length.

21. A method as in claim 19, wherein subsequent to removal of products from the conveyor, at least one product shifted downstream beyond the accumulator means is relocated upstream with reverse operation of the outfeed shift member and thereafter reclamped with the outfeed brake means, further whereafter the outfeed shift member is removed from the product flow path along the conveyor until a subsequent product removal sequence is initiated, so that such upstream relocating and reclamping steps permit a subsequent downstream shifting step to be performed for subsequent product removal sequences.

22. An infeed product engagement apparatus for use along a conveyor forming a pathway moving in a defined downstream direction between two workstations and feeding products through an accumulator means of the type which controllably removes a queue of products from the conveyor whenever there is a backup of products within such accumulator means, said apparatus comprising:

interruption means for selectively interrupting product travel in at least a first part of the moving pathway of the conveyor situated relatively upstream from the accumulator means; and guide means, situated relatively upstream from said interruption means, for selectively guiding products carried on the conveyor into the pathway first part, so that downstream movement of such guided products is subsequently interrupted by said interruption means wherein said interruption means comprises a movable stop member for controlled movement between a first position laterally adjacent the conveyor pathway and a second position extending across part of the conveyor pathway comprising said first part thereof, so that the remaining noninterrupted portion of the conveyor pathway has a width greater than the nominal width of products feeding along the conveyor.

23. An infeed product engagement apparatus as in claim 22, wherein said movable stop member comprises a piston actuated sliding plate extending substantially perpendicular to the conveyor pathway.

24. An infeed product engagement apparatus as in claim 23, wherein the piston for said sliding plate is oriented at generally about a right angle to the line of movement of said plate and is associated with means for translating motion of such piston into motion of such plate along its line of movement.

25. An infeed product engagement apparatus as in claim 22, further including fixed deflector means, mounted relatively downstream from said movable stop member and extending into a portion of the conveyor pathway which becomes uninterrupted whenever said movable stop member assumes said first position thereof, for deflecting products away from the lateral edge of the conveyor pathway to which said movable stop member is adjacent.

26. An infeed product engagement apparatus as in claim 22, wherein said guide means comprises a movable
product guiding member for controlled movement between a first position laterally adjacent the conveyor pathway on the opposite side thereof from said movable stop member and a second position extending across part of the conveyor pathway so that products thereon are guided towards said pathway first part.

27. An infeed product engagement apparatus as in claim 26, wherein said movable product guiding member comprises a piston actuated wedge shaped member, the actuation of which is coordinated with actuation of said movable stop member.

28. An outfeed product engagement apparatus for use along a conveyor forming a pathway moving in a defined downstream direction between two workstations an feeding products through an accumulator means of the type which controllably removes a queue of products from the conveyor whenever there is a backup of products within such accumulator means, said apparatus comprising:

a controllable product engagement member;
engagement actuation means for selectively positioning said product engagement member between a first position thereof relatively just downstream from the accumulator means and relatively adjacent the conveyor so as to stop the movement of products along the pathway thereof, and a second position thereof adequately displaced from the conveyor so as to not contact products thereon; and shift actuation means for selectively shifting said product engagement member with products received thereagainst between said first position thereof, and a third position thereof relatively adjacent the conveyor so as to stop the movement of products therealong and downstream from said first position by a total shift distance comprised of a predetermined minimum shift distance added to the length of a product being moved on the conveyor, while feeding of products into the upstream end of the accumulator means is controlled, so that products to be removed from the conveyor with the accumulator means may be controllably shifted relative thereto prior to such removal so as to prevent product shear points between the accumulator means and such products and between the accumulator means and products remaining on the conveyor.

29. An outfeed product engagement apparatus as in claim 28, wherein said shift actuation means includes shift adjustment means for user-selected adjusting of said total shift distance.

30. An outfeed product engagement apparatus as in claim 29, wherein said shift actuation means includes a controllable piston actuator for controllably moving said product engagement member, and said shift adjustment means includes an adjustable stop member, the user-selected position of which establishes said third position of said product engagement member, so that a user may selectively adjust said total shift distance.

31. An outfeed product engagement apparatus as in claim 30, further including first position adjustment means for user-selected adjusting of the position of said controllable piston actuator, so that a user may selectively adjust said product engagement member first position.

32. An outfeed product engagement apparatus as in claim 28, wherein:
said engagement actuation means is piston actuated by a first piston having a generally vertical axis perpendicular to the conveyor pathway, such first piston when extended placing said product engagement member in said first position thereof, and when retracted placing said product engagement member in said second position thereof; and
said shift actuation means is piston actuated by a second piston having a generally horizontal axis parallel to the conveyor pathway, such second piston when extended placing said product engagement member in said first position thereof, and when retracted placing said product engagement member in said third position thereof.

33. An outfeed product engagement apparatus as in claim 32, wherein:
said first and second pistons may be simultaneously actuated for simultaneous movement of said product engagement member along two axes; and
said first piston includes at least one pivotable mounting relative said product engagement member so as to permit user-selected adjustment of the location of said first position relative an accumulator means downstream end.

34. An improved accumulator device generally of the type having a vertically-oriented conveyor with a plurality of spaced, outwardly extending veins for accumulating products therebetween, with indexing of such conveyor in selected directions resulting alternatively in removal or return of products relative a carrying surface of a production line with which such accumulator device is associated in such fashion that given of the extending veins may be situated in a null position for the passage of products therethrough carried on the production line with such veins acting as guide rails, said improved accumulator device including output shift means relatively adjacent the output of the accumulator device and operative for selectively shifting products a selected downstream distance, and input product trapping means relatively adjacent the input of the accumulator device a selected upstream distance therefrom and operative for selectively capturing without use of clamping force the leading edge of the next product having its leading edge upstream therefrom, said selected downstream distance comprising the nominal length of one of the production line products added to said selected upstream distance, so that cooperative actuation of said output shift means and said input product trapping means prevent the occurrence of product shear points adjacent input and output edges of the conveyor veins.

35. An improved accumulator device as in claim 34, wherein said selected upstream distance falls generally in a range of from about 30 percent to about 70 percent of the nominal production line product length, and wherein the shift distance of said output shift means is adjustable so as to accommodate accumulator device use with different length products and a selected upstream distance.

36. An improved accumulator device as in claim 34, wherein said output shift means may be selectively extended into and withdrawn from a product engaging position relative the production line carrying surface, and wherein said output shift means includes a selective shift control piston actuator, the extended and retracted positions of which are both adjustable, so that said selected downstream distance and the location thereof relative the production line may both be adjusted.

37. An improved accumulator device as in claim 34, wherein said input product trapping means includes a pair of first and second members operative on opposite lateral sides of the production line, wherein said first member comprises a stop plate which is injected across a limited portion of the production line carrying surface such that a space remains which is larger than the nominal width of a production line product, and wherein said second member is relatively upstream from said first member and comprises a deflector guide which is injected across a limited portion of the production line carrying surface such that a space remains which is larger than the nominal product width, but which second member injection causes products striking such deflector guide to move to a portion of the production line carrying surface which results in the leading edge of any such products subsequently engaging said stop plate.

38. An improved accumulator device as in claim 37, wherein said stop plate and said deflector guide are respectively injected by piston actuators which are commonly controlled.

39. Product handling apparatus for controlling the flow of products advancing along a conveyor from a first workstation to a second workstation, said apparatus including:
accumulator means, adjacent the conveyor between the first and second workstations, for controllably alternately removing and returning products relative the conveyor, said accumulator means having respective infeed and outfeed sides generally between which products may be alternately removed from and returned to the conveyor;

pinchless infeed product trapping means, associated with said accumulator means infeed side, for being controllably actuable for stopping without applying clamping force the entry of products along the conveyor into said accumulator means infeed side, which products still have their leading edges upstream from said trapping means;

outfeed brake means, associated with said accumulator means outfeed side, for being controllably actuated for stopping products along the conveyor from emerging from said accumulator means outfeed side;

downstream sensor means, situated alongside the conveyor a predetermined distance downstream from said accumulator means outfeed side, for detecting the passage of products thereby;

outfeed shift means, controllably actuable for selectively moving into and out of the path of products along the conveyor downstream from said outfeed brake means and upstream from said downstream sensor means, said shift means being also controllably actuable for shifting relatively downstream along the conveyor an adjustable, user-selected distance greater than at least the length of one of the products advancing along the conveyor; and control means operatively associated with said accumulator means, pinchless infeed product trapping means, outfeed brake means, downstream sensor means, and outfeed shift means, respectively, for temporarily accumulating products off-line of the conveyor whenever excessive numbers of products queue up between the first and second workstations;

wherein said control means operates in a normal run mode to alternately actuate and deactuate said outfeed brake means for preventing products from leaving said accumulator means outfeed side until a predetermined number of previously released products have passed said sensor means, and wherein said control means operates in a product removal mode whenever actuation of said outfeed brake means in the normal run mode results in a queue of products extending through the accumulator means from said outfeed side thereof back to said infeed side thereof;

and wherein such product removal mode includes actuating said pinchless infeed product trapping means to stop the leading edge of the next adjacent upstream product on the conveyor from entering said accumulator means infeed side, deactuating said outfeed brake means and actuating said outfeed shift means so as to permit relative shifting of products on the conveyor within said accumulator downstream by said adjustable, user-selected distance, and controlling said accumulator means for removing such products from the conveyor, so that product shear points are positively eliminated during product removal regardless of the initial position of products relative the accumulator means infeed side or the number of products being removed during a given product removal sequence.

40. A product handling apparatus as in claim 39, wherein:

said accumulator means includes a vertical conveyor mechanism having a plurality of spaced, outwardly extending flights thereon for the accumulation of products between adjacent of such flights;

said control means functions during the absence of any products on the conveyor within said accumulator means so as to return products to such conveyor which were previously removed therefrom by said accumulator means;

said accumulator means includes fixed guide members generally perpendicular to the advancing direction of the conveyor and separated by a predetermined distance from respective infeed and outfeed edges of said vertical conveyor mechanism outwardly extending flights, so as to prevent escape of products from such flights at the infeed and outfeed edges thereof;

said pinchless infeed product trapping means is situated a predetermined distance upstream from the infeed edges of said vertical conveyor mechanism outwardly extending flights; and said downstream shifting distance is equal to generally about the nominal length of individual products advancing along the conveyor added to said predetermined distance, such that products to be accumulated are positively advanced at least downstream beyond the fixed guide member on the infeed side of the accumulator means so as to prevent the occurrence of any product shear points between such guide member and products being accumulated.

41. Product handling apparatus as in claim 40, wherein products advancing along the conveyor comprise paper-based packages having a nominal length of about 1½ inches to about 3 inches and being filled with liquid materials, the first workstation comprises a filler machine, the second workstation comprises either of a straw-applicator or packing machine, and said predetermined number of products is 3.

42. Product handling apparatus as in claim 39, wherein said outfeed shift means comprises:

a controllable product engagement member;

engagement actuation means for selectively positioning said product engagement member between a first position thereof relatively just downstream from the accumulator means and relatively adjacent the conveyor so as to stop the advancement of products therealong, and a second position thereof adequately displaced from the conveyor so as to not contact products thereon; and shift actuation means for selectively shifting said product engagement member with products received thereagainst between said first position thereof, and a third position thereof relatively adjacent the conveyor so as to stop the advancement of products therealong and downstream from said first position by a total shift distance comprised of a predetermined minimum shift distance added to the nominal length of a product being moved on the conveyor.

43. Product handling apparatus as in claim 39, wherein said pinchless input product trapping means includes a pair of first and second members operative on opposite lateral sides of the conveyor, wherein said first member comprises a stop plate which is injected across a limited portion of the conveyor such that a space remains which is larger than the nominal width of an advancing product, and wherein said second member is relatively upstream from said first member and comprises a deflector guide which is injected across a limited portion of the conveyor such that a space remains which is larger than the nominal product width, but which second member injection causes products striking such deflector guide to move to a portion of the conveyor which results in the leading edge of any such products subsequently engaging said stop plate.

* * * * *